3,197,425
PROCESS FOR PIGMENTING PLASTIC
MATERIALS
Roderich König, Riehen, near Basel, and Karl Keller, Basel, Switzerland, assignors to J. R. Geigy A.-G., Basel, Switzerland
No Drawing. Filed July 14, 1960, Ser. No. 42,768
Claims priority, application Switzerland, July 15, 1959, 75,774
7 Claims. (Cl. 260—23)

The present invention concerns a process for the dyeing of plastics. It also concerns the preparations of the dyestuff used for the purpose, in addition the dyed plastics themselves and, finally, as industrial product, the objects made up therefrom.

It has been found that homogenously dyed plastics are obtained if, in addition to the color pigments, also condensation products of low molecular alkanolamines with those fatty acids having a lipophilic radical of at least 10 carbon atoms are added to the macromolecular organic starting materials.

The high molecular starting materials are chiefly the known thermoplastic synthetic resins, in particular polyethylene, polypropylene, polystyrene and polyvinyl chloride as well as copolymers of such compounds. Of these plastics, polyethlene is preferred because of its valuable properties.

By pigments, insoluble coloring agents are meant and insoluble relates in the first instance to the behaviour towards water. Also this insolubility or at least difficult solubility towards the plastics themselves and towards the additives of organic nature present therein such as, e.g. plasticizers, is often desirable. On the other hand, also water insoluble coloring agents which are soluble in organic solvents can be used in polystyrene. The pigments used according to the present invention can be of inorganic or organic nature. Of the organic pigments both those having no water solubilizing groups, e.g. no sulphonic acid groups, and also those pigments obtained from water soluble dyestuffs by sorption onto suitable substrata or by conversion into insoluble metal compounds can be used. Preferred pigments are those of the azo, anthraquinone and phthalocyanine series. Titanium dioxide and carbon black are the preferred inorganic pigments.

According to their chemical composition, the condensation products used according to the invention from low alkanolamines with higher molecular fatty acids are acid amide and/or acid ester compounds. The hydroxyalkylamine or oxyalkylamine radicals can be derived from primary or secondary or tertiary aliphatic mono- or polyamines. They can also contain other atom groups provided these do not lend the fatty acid condensation products too strong hydrophilic properties. Examples of such groups are the radicals of mono-, di- and tri-ethanolamine, N-methyl-, N-ethyl- and N-butyl- ethanolamine, N-methyl-, N-ethyl- and N-butyl- dihydroxy- propylamine, trihydroxy-t-butylamine, N-hydroxyethylethylenediamine, N,N'-dihydroxyethylethylenediamine and N,N',N"-trihydroxyethyldiethylenetriamine. The carboxylic acid radicals are derived in their turn advantageously from aliphatic monocarboxylic acids with at least 10 and, advantageously, less than 40 carbon atoms. The aliphatic hydrocarbon chains of the acid radicals can be interrupted by bridging groups such as, e.g. oxygen or sulphur ether groups, or by aromatic radicals. Examples of acid radicals are those of lauric acid, myristic acid, palmitic acid and stearic acid, undecylenic acid, oleic acid, elaidic acid, riccinic acid, erucic acid and linoleic acid, decyl, dodecyl, hexadecyl, octadecyl oxyacetic acids and thioacetic acids, octyl and nonyl phenoxyacetic acids and phenyl-stearic acid. Naturally in the present process, also the condensation products of mixtures of fatty acids, e.g. those of the so-called coconut acid, or condensation products of mixtures of alkanolamines with fatty acids or with mixtures of fatty acids can be used.

Preferred compounds used according to the invention are acid amides of the general formula

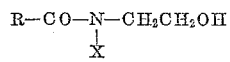

wherein
R—CO— represents the acyl radical of a monobasic acid with 10–20 carbon atoms and
X represents a member selected from the group consisting of H and —CH$_2$CH$_2$OH.

In the above formula R—CO— is, in particular, the acyl radical of decyloxyacetic acid, dodeclyphenoxy acetic acid, decylthioacetic acid and of coconut acid, compounds in which X is hydrogen and R—CO— the radical of decylthioacetic acid or coconut acid being preferred in particular. Here and in the following, "coconut acid" means the mixture of fatty acids derived from hydrolysis of coconut oil. The acid chain lengths thereof have mostly 10, 12 and 14 carbon atoms.

In addition to the components to be used as defined, also other auxiliary agents such as, e.g. stabilizing and lubricating agents or also fillers can be incorporated into the plastics. Many of the fatty acid-alkanolamine condensation products used according to the invention are of a waxy consistency. Because of this property it is possible that, on mixing with the pigment or with the plastic which is generally used in granulate form, the condensation products can reduce the lubricant and flowing properties thereof. Thus, in particular the adhesion, for example of sheets on calander surfaces, can be promoted. The disadvantageous effects of this property of many fatty acid-alkanolamine condensation products can generally be easily removed by simultaneously mixing lubricants with these substances. As a matter of fact, preparation of the mixture without the lubricant is not possible in the realization of the process on an industrial scale since it assists in the preparation of the mixture which contains amides of waxy consistency. As such, for example, zinc, magnesium or calcium salts of natural or synthetic fatty acids such as stearic acid or similar acids can be used. These agents are used, for example, in the twofold to fivefold amount, advantageously however, in about the same amounts as the fatty acid-alkanolamine derivatives. In the present process, calcium stearate is the preferred lubricant.

The fatty acid-alkanolamine condensation products according to the invention are used in amounts of about 30 to 50%, calculated on the weight of the pigment used. Including the lubricant, weight proportions of about 1:2:1 are particularly favorable, i.e. advantageously a mixture of 1 part of fatty acid-alkanolamine derivative, 2 parts of pigment and 1 part of lubricant is used. The two or three components above mentioned are incorporated into the plastic by milling them together, for example in the so-called colloplex mill. The mixture is then added to the plastic and thoroughly mixed therewith by means of the usual mixing apparatus. The mixture of plastic-pigment can then be further worked up direct, for example, sprayed in the extruder or blown to form sheets. In this way, very homogeneously dyed fine and strongly colored synthetic mouldings are obtained. The fine dispersion of the pigment has proved to be very valuable particularly in sheets, as these have a thickness on the average of only 0.005 to 0.007 mm. and, therefore, inhomogeneity of the dyeing is extraordinarily easy to determine in them.

Up to now it has generally been necessary to homogenise the plastic-pigment mixtures in special apparatus and then again to granulate which, economically and technically, is a great disadvantage. Actually, with the pigments ordinarily used without this treatment generally only synthetic dyeings were obtained which were not uniformly dyed and were frequently of weak strength.

The following examples only serve to illustrate the invention. They do not limit it in any way. Where not expressly stated, parts are given as parts by weight therein. Their relationship to parts by volume is as that of grams to millilitres. The temperatures are in degrees centigrade.

EXAMPLE 1

1 part of decyloxy acetic acid-($\beta$-hydroxyethyl)-amide and 1 part of calcium stearate are mixed and milled. Then 2 parts of this mixture and 2 parts of the disazo dyestuff from 1 mol of diazotised 3,3'-dichlorobenzidine and 2 mols of acetoacetyl-(2',4'-dimethylphenyl)-amide are thoroughly mixed while milling in the colloplex mill.

2 parts of this dyestuff preparation and 500 parts of polyethylene granulate are mixed in a mixing apparatus for 30 minutes and the mixture is blown into sheets from the extruder.

The polyethylene sheets so obtained are distinguished by a beautiful, homogeneous yellow coloring. Particles of dyestuff are not visible to the naked eye.

If, instead of the above fatty acid-alkanolamide mixture, the same amount of coconut acid-$\beta$-hydroxyethylamide mixture, decyloxyacetic acid-(di-$\beta$-hydroxyethyl)-amide, decylthioacetic acid-($\beta$-hydroxyethyl)-amide, decylthioacetic acid-(di-$\beta$-hydroxyethyl)-amide, dodecylphenoxyacetic acid-($\beta$-hydroxyethyl)-amide or tri-$\beta$-hydroxyethylamine monoester of decylthioacetic acid is used, and otherwise the same procedure is followed, then polyethylene sheets which are just as homogeneously dyed are obtained.

EXAMPLE 2

1 part of coconut acid-$\beta$-hydroxyethylamide mixture and 1 part of calcium stearate are mixed and milled. 2 parts of the condensation product from 1 mol of 1,4-dibromoanthraquinone and 2 mols of 1-amino-2,4,6-trimethylbenzene are then incorporated into this mixture by milling in a colloplex mill.

0.1 part of this color-containing mixture are mixed with 100 parts of polystyrene granulate in a mixing apparatus for 30 minutes and then the colored polystyrene is formed from an injection moulding machine.

The polystyrene mouldings are distinguished by a beautiful, homogeneous, blue dyeing. No dye particles are visible with the naked eye.

If, instead of the above mixture of fatty acid-alkanolamide, the same amount of decyloxyacetic acid-($\beta$-hydroxyethyl)-amide, decyloxyacetic acid-(di-$\beta$-hydroxyethyl) - amide, decylthioacetic acid-($\beta$-hydroxyethyl)-amide, decylthioacetic acid-(di-$\beta$-hydroxyethyl)-amide, dodecylphenoxyacetic acid-($\beta$-hydroxyethyl)-amide or tri-$\beta$-hydroxyethylamine monoester of decylthioacetic acid is used and otherwise the same procedure is followed, then polystyrene mouldings the dyeing of which is equally homogeneous are obtained.

EXAMPLE 3

Equal parts of coconut fatty acid-($\beta$-hydroxyethyl)-amide mixture and the calcium lake of the monoazo dyestuff from diazotised 2-chloro-4-amino-1-methylbenzene-5-sulphonic acid and 2-hydroxy-3-naphthoic acid are thoroughly mixed. 5 parts of this mixture are then mixed in a mixing apparatus with 500 parts of polyethylene granulate and the pigmented polyethylene is then blown into a sheet of about 0.005 mm. This sheet is dyed red very homogeneously. No dyestuff particles are visible with the naked eye.

If, instead of the fatty acid amide mentioned above, the same amount of a compound mentioned in the last paragraph of Example 2 is used, very uniform dyeings are also obtained.

EXAMPLE 4

1 part of decylthioacetic acid-($\beta$-hydroxyethyl)-amide and 4 parts of magnesium stearate are mixed and milled. 5 parts of a chlorinated copper phthalocyanine pigment are then incorporated into 5 parts of the mixture by milling in the colloplex mill.

3 parts of this dye preparation are then mixed in a mixing apparatus for 30 minutes with 500 parts of polyethylene granulate and the mixture is blown into sheets from the extruder.

The polyethylene sheets so obtained are distinguished by a very homogeneous green dyeing.

If, instead of magnesium stearate, the same amount of calcium or zinc stearate is used, very homogeneously dyed polyethylene sheets are also obtained.

EXAMPLE 5

To produce an opaque sheet, first the following two mixtures are prepared:

(A) *Colored pigment reduction.*—1 part of coconut fatty acid-($\beta$-hydroxyethyl)-amide mixture and 1 part of calcium stearate are mixed and milled. Then 1 part of this reduction agent is mixed and milled in the colloplex mill with 1 part of the disazo dyestuff from 1 mol of diazotised 3,3'-dichlorobenzidine and 2 mols of 1-phenyl-3-methyl-5-pyrazolone.

(B) *White pigment reduction.*—1 part of coconut fatty acid monoethylamide mixture and 1 part of calcium stearate are mixed and milled. Then 1 part of this reduction agent is mixed and milled in a colloplex mill with 1 part of titanium dioxide in the same manner.

5 parts of the colored pigment reduction and 20 parts of the white pigment reduction are then thoroughly mixed for 30 minutes in a mixer with 500 parts of polyethylene granulate.

The opaque polyethylene sheets obtained from this pigment-plastic mixture by blowing are distinguished by a very homogeneous orange coloring. No pigment particles are visible with the naked eye.

If, in the above example, instead of the disazo dyestuff, copper phthalocyanine or the iron lake of 1-nitroso-2-naphthol is used and otherwise the same procedure is followed, then blue or green colored polyethylene sheets are obtained, the dyeing of which is equally homogeneous.

EXAMPLE 6

2 parts of coconut fatty acid-$\beta$-hydroxyethylamide mixture and 2 parts of calcium stearate are mixed and milled. 4 parts of the disazo dyestuff from 1 mol of diazotised 3,3'-dichlorobenzidine and 2 mols of acetoacetyl-(2',4'-dimethylphenyl)-amide are then incorporated into this mixture by milling in the colloplex mill.

0.8 part of this mixture containing pigment and 100 parts of a composition consisting of 70% polyvinyl chloride (cable quality), 26% dioctyl phthalate and 4% basic lead carbonate are mixed in a mixing apparatus for 30 minutes and then worked up from the extruder in tube form. The tubes are distinguished by a beautiful, yellow, homogeneous dyeing, no dye particles being visible to the naked eye.

If, instead of the 2 parts of the above fatty acid-alkanolamide mixture, an equal amount of decyloxyacetic acid-($\beta$-hydroxyethyl)-amide, decyloxyacetic acid-(di-$\beta$-hydroxyethyl)-amide, decylthioacetic acid-($\beta$-hydroxyethyl)-amide, decylthioacetic acid-(di-$\beta$-hydroxyethyl)-amide, dodecylphenoxyacetic acid - ($\beta$ - hydroxyethyl)-amide or tri-$\beta$-hydroxyethylamine monoester of decylthioacetic acid is used and otherwise the same procedure is followed, then polyvinyl chloride samples which are just as well homogeneously dyed are obtained.

EXAMPLE 7

25 parts of decylthioacetic acid-(di-β-hydroxyethyl)-amide and 225 parts of calcium stearate are mixed and milled. 250 parts of the calcium lake of the azo dyestuff from diazotised 4-amino-2-chloro-1-methylbenzene-5-sulphonic acid and 2-hydroxy-3-naphthoic acid are then incorporated by milling in the colloplex mill into 250 parts of the mixture.

5 parts of this mixture containing pigment are mixed in a mixer for 30 minutes with 500 parts of polyethylene granulate and the plastic is then blown from the extruder.

The polyethylene sheets obtained in this manner are distinguished by a beautiful, red, homogeneous dyeing.

EXAMPLE 8

2 parts of coconut fatty acid-β-hydroxyethylamide mixture are mixed and then milled with 2 parts of calcium stearate. 4 parts of this mixture and 4 parts of a chlorinated copper phthalocyanine pigment are then milled together in a colloplex mill.

10 parts of this dye preparation are mixed for 30 minutes with 500 parts of polypropylene and the mixture is blown into polypropylene sheets from the extruder. The polypropylene sheets so obtained are distinguished by a very homogeneous green dyeing.

If, instead of the above fatty acid-alkanolamide mixture, the same number of parts of decylthioacetic acid-(β-hydroxyethyl)-amide are used and otherwise the same procedure is followed, then polypropylene sheets are obtained the dyeing of which is equally homogeneous.

What we claim is:

1. A process for pigmenting plastic resin materials selected from the class consisting of thermoplastic polyethylene, polypropylene, polystyrene and polyvinyl chloride resins, which comprises thoroughly admixing a mixture of pigment lubricant and amide of the general formula $$R-CO-N-CH_2CH_2OH$$
$$\quad\quad\quad\ \ |$$
$$\quad\quad\quad\ \ X$$

wherein

R—CO— represents the acyl radical of a monobasic hydrocarbon carboxylic acid with 10–20 carbon atoms and X represents a member selected from the group consisting of H and —CH$_2$CH$_2$OH, with said resin materials prior to the shaping of the latter, said mixture containing 30 to 50% by weight of said amide calculated on said pigment, and the amount of said lubricant being at least about equal to that of said amide, thereby obtaining a homogeneously pigmented mixture.

2. Process according to claim 1 in which the lubricant is selected from the group consisting of calcium-, zinc- and magnesium-stearate.

3. A process for pigmenting plastic resin materials selected from the class consisting of thermoplastic polyethylene, polypropylene, polystyrene and polyvinyl chloride resins, which comprises thoroughly admixing a mixture of pigment, a lubricant selected from the group consisting of calcium-, zinc- and magnesium-stearate, and an amide of the formula $$L—CO—NHCH_2CH_2OH$$

wherein L—CO— represents an acyl radical of an acid selected from the group consisting of coconut acid and decylthioacetic acid, with said resin material prior to the shaping of the latter, in said mixture the weight ratio of pigment, lubricant and amide being substantially 2:1:1, thereby obtaining a homogeneously pigmented mixture.

4. A process for pigmenting thermoplastic polyethylene resin which comprises thoroughly admixing a mixture of substantially 2 parts of a pigment, 1 part of calcium stearate and 1 part of coconut acid-β-hydroxyethylamide with said polyethylene prior to the shaping of the latter thereby obtaining a homogeneously pigmented mixture.

5. A coloring composition for the coloring of plastic resin materials selected from the class consisting of thermoplastic polyethylene, polypropylene, polystyrene and polyvinyl chloride resins, consisting essentially of a pigment, a lubricant selected from the group consisting of a calcium-, zinc- and magnesium- stearate, and an agent capable of promoting homogeneous distribution of the pigment in said plastic material, which agent is of the general formula $$R-CO-N-CH_2CH_2OH$$
$$\quad\quad\quad\ \ |$$
$$\quad\quad\quad\ \ X$$

wherein

R—CO— represents the acyl radical of a monobasic acid with 10-20 carbon atoms and X represents a member selected from the group, consisting of H and —CH$_2$CH$_2$OH the amount of said agent being about 30 to 50% by weight calculated on said pigment, and the amount of said lubricant being at least about equal to that of said agent.

6. A coloring composition for the coloring of plastic resin materials selected from the class consisting of thermoplastic polyethylene, polypropylene, polystyrene and polyvinyl chloride resins, consisting essentially of a pigment, a lubricant selected from the group consisting of calcium-, zinc- and magnesium-stearate, and an agent capable of promoting homogeneous distribution of the pigment in said plastic material, said agent being selected from the group consisting of coconut acid-β-hydroxyethylamide and decylthioacetic acid-(-β-hydroxyethyl)-amide, the weight ratio of pigment, lubricant and amide being substantially 2:1:1.

7. A coloring composition for the coloring of plastic resin materials selected from the class consisting of thermoplastic polyethylene, polypropylene, polystyrene and polyvinyl chloride resins, consisting essentially of a pigment, calcium stearate and coconut acid-β-hydroxyethylamide, the weight ratio of pigment, stearate and amide being substantially 2:1:1.

References Cited by the Examiner

UNITED STATES PATENTS

| | | | |
|---|---|---|---|
| 1,946,052 | 2/34 | Baldwin | 106—308 |
| 2,077,167 | 4/37 | Crouet | 106—308 |
| 2,758,984 | 8/56 | Coler. | |
| 2,770,609 | 11/56 | Symonds | 260—41 |
| 2,773,852 | 12/56 | Rowe et al. | 260—32.6 |
| 2,843,557 | 7/58 | Safford | 260—30.6 |
| 2,933,416 | 4/60 | Haakh et al. | |
| 2,956,979 | 10/60 | Rowland et al. | 260—32.6 |

TOBIAS E. LEVOW, *Primary Examiner.*

ALPHONSO D. SULLIVAN, *Examiner.*